No. 699,013. Patented Apr. 29, 1902.
J. M. RAUHOFF.
MECHANISM FOR CONVERTING MOTION.
(Application filed July 2, 1900. Renewed Apr. 8, 1901.)
(No Model.)
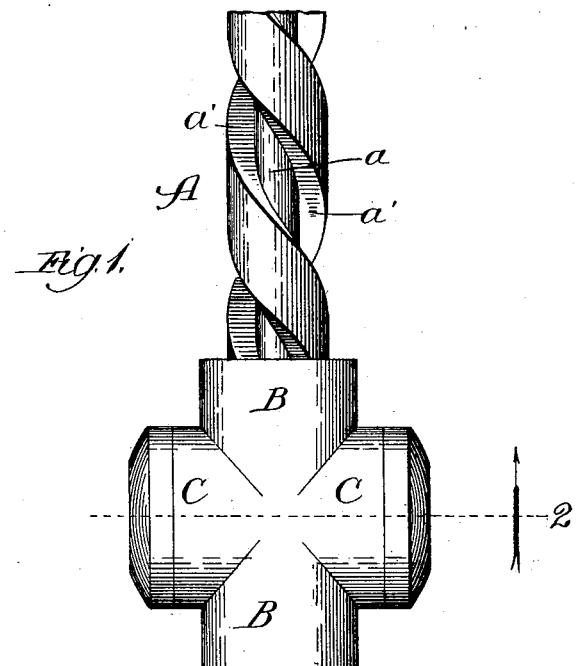
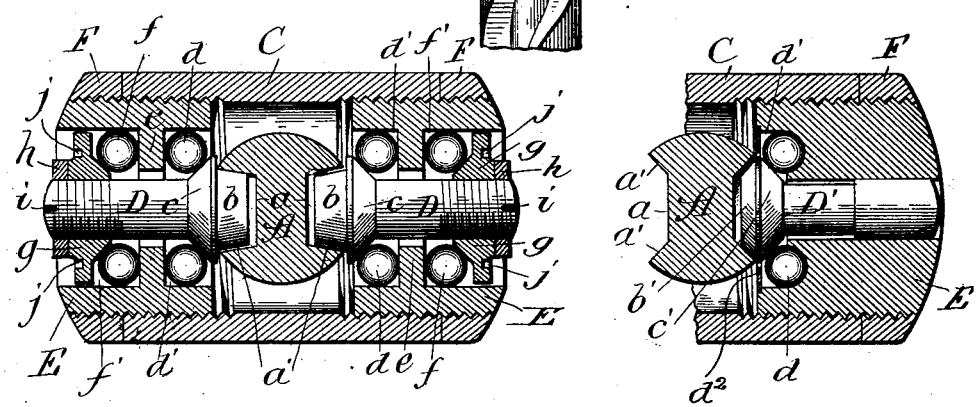
Witnesses:
Inventor.
John M. Rauhoff,
By Banning & Banning,
Attys.

UNITED STATES PATENT OFFICE.

JOHN M. RAUHOFF, OF CHICAGO, ILLINOIS.

MECHANISM FOR CONVERTING MOTION.

SPECIFICATION forming part of Letters Patent No. 699,013, dated April 29, 1902.

Application filed July 2, 1900. Renewed April 8, 1901. Serial No. 54,921. (No model.)

*To all whom it may concern:*

Be it known that I, JOHN M. RAUHOFF, a citizen of the United States, residing at Chicago, in the county of Cook and State of Illinois, have invented a certain new and useful Improvement in Mechanisms for Converting Motion, of which the following is a specification.

This invention relates to that class of mechanisms or devices for converting a reciprocating into a rotary motion and in which a spiral groove and a coacting roller or bearing running in the groove constitute the means for producing a rotary motion from a reciprocating movement.

The object of the invention is to insure a more positive and reliable coöperation between the traveling rollers or bearings and the grooves with a reduction in friction effect and a more direct coaction between the parts.

A further object is to furnish a better support and bearing for the stems or journals of the rollers or traveling bearings with less friction and a provision for taking up wear, and further objects will appear from the description hereinafter.

The invention consists in the features of construction and combination of parts hereinafter described, and pointed out in the claims as new.

In the drawings illustrating my invention, Figure 1 is a plan view showing a section of a shaft to be rotated and the reciprocating head thereon; Fig. 2, a transverse section on line 2 of Fig. 1; and Fig. 3, a transverse section of the reciprocating head, showing a modification in the construction and arrangement of the rollers or traveling contacts or bearings.

The shaft to be driven can be a shaft A of the size and length required, and this shaft has extending around its body a spiral groove $a$, the walls $a'$ of which are formed with a taper or incline. On this shaft is mounted a traveling head of any suitable construction, as shown. The head has a body formed of a tube B and a tube C, standing in right-angle relation to each other, the tube B to surround or encircle the shaft and travel forward and back thereon, for which purpose the tube B has a longitudinal opening therein of a diameter corresponding to the diameter of the shaft and so as to give a bearing on the shaft without any appreciable friction in the movements of the head.

The cross-tube C receives at each end a stem or journal D, the outer end of which in the form shown in Fig. 2 is screw-threaded. The inner end of each stem has thereon a cone-shaped or tapered bearing or contact $b$ of a little less diameter than the width of the spiral groove $a$ and with its face or periphery having a coinciding taper to that of the walls $a'$ of the spiral groove, as shown in Fig. 2, so that when the bearings or contacts are in the groove they will bear against the opposite side walls of the spiral groove in the travel of the head on the shaft, with a clearing-space between the bottom of the groove and the end of the bearing or contact. Adjacent to the bearing or contact of each stem is a fixed cone $c$, having a tapered or inclined bearing-face against which balls $d$ bear, which balls are located in a race $d'$ of a sleeve E, having an exterior screw-thread and entered into the end of the cross-tube C. The sleeve E has a rib or flange $e$, forming one face of the race $d'$, and the opposite side of the flange forms one face of a race $f'$, in which are balls $f$, which bear on the inclined or tapered face of a cone $g$, screw-threaded onto the end of the stem and locked and held when properly adjusted by a nut $h$, entered onto the screw-threaded end of the stem. The screw-thread of the stem in conjunction with the adjustable cone $g$ and the fixed cone $c$ enable the necessary adjustment to compensate for wear and also to give a true rolling bearing without appreciable friction for the retention of the stem and its end bearing or contact in the travel through the spiral groove. The outer end of the stem, as shown, has a nick $i$ for receiving the end of a screw-driver or other retainer, by means of which the stem can be held fixed for the adjustment of the movable cone $g$ and the turning forward of the lock-nut $h$ to hold the cone in adjusted position, and, as shown, in order to adjust the movable cone perforations or holes $j$ are provided in its outer face for the connection of a spanner-wrench or other tool, so that the cone can be advanced or receded, as required for the adjustment. The sleeve E can be advanced to project the bearing or contact end of the stem or journal D the proper distance into the spiral groove, and when adjusted the sleeve can be locked and held by a ring-nut F, screw-threaded onto the end of the sleeve and bearing against the end of the cross-tube. It will thus be seen that the rolling bearings or contacts carried by the stems or journals are located opposite each other and enter the spiral groove on opposite sides of the shaft and that when entered each rolling contact or bearing engages the opposite wall or face of the groove, giving a uniform engagement and an equalization of the force exerted on the shaft. It will be seen, further, that the stems or journals have a support through the cones and balls, by which the friction is reduced, and by having the cones with considerable space between them, as shown in Fig. 2, an end bearing is provided for the stem or journal, by which it will be supported against side strain or twisting in the travel of the head on the shaft. It will also be seen that by reason of the clearance at the end of the rolling bearing or contact provision is made for the advancing of the bearing or contact in case of wear and so as to maintain the uniformity of engagement at all times between the bearings or contacts and the walls of the spiral groove, and by reason of the coinciding taper or incline of the walls of the spiral groove and the peripheral face or wall of the contacts or bearings a continuous action is secured by which the rotation of the shaft will be positive and certain from the reciprocation of the head.

The feature of a spiral groove with inclined or tapered side walls or faces is applicable for and intended to be used with traveling bearings or contacts on a rotatable stem or journal without the provision of double cones and balls for sustaining the stem or journal. An arrangement to this end is shown in Fig. 3, in which the end of the sleeve E has a division strip or plate $d^2$, forming one wall of the race $d'$, and the inner end face of the sleeve has a semicircular groove or recess therein for the other wall of the race. The stem or journal D' is of less diameter adjacent to the cone-face $c'$, and its outer end fills the bore or opening of the sleeve, so as to furnish less frictional surface for the journal or stem. The tapered or inclined cone-shaped bearing or contact $b'$, as shown in Fig. 3, is of less depth than the corresponding part in the construction of Fig. 2, and the receiving spiral is also of less depth than in Fig. 2; but a clearance-space is provided between the bottom of the groove and the end face of the bearing or contact, the same as in Fig. 2, and the cone-shaped bearing or contacts engage and travel on the opposite walls of the spiral groove on one side only, as described for the construction of Fig. 2. This modified form of construction shown in Fig. 3 is applicable in places where a reduction of friction to the minimum is not necessary or required, and with the exception of friction the operation is the same as for the construction described of Fig. 2.

I claim—

1. In a mechanism for converting motion, the combination of a shaft having in its body a spiral groove with tapered or inclined side walls or faces, a head mounted on the shaft, journals or stems rotatably mounted in the head on opposite sides thereof each journal or stem having a bearing or contact with a cone-shaped or tapered peripheral face or wall to engage the side face or wall of the spiral groove, and an adjustable journal-bearing for carrying each journal or stem, entered into the head on opposite sides and transversely of the shaft, substantially as described.

2. In a mechanism for converting motion, the combination of a shaft having in its body a spiral groove with tapered or inclined side walls or faces, a head mounted on the shaft and endwise movable thereon, journals or stems rotatably mounted in the head on opposite sides thereof each journal or stem having a bearing face or contact with a cone-shaped or tapered peripheral face or wall and of a less diameter than the width of the spiral groove for engagement with the side face or wall of the spiral groove on opposite sides of the contact or bearing and an adjustable journal-bearing for carrying each journal or stem entered into the head on opposite sides and transversely of the shaft, substantially as described.

3. In a mechanism for converting motion, the combination of a shaft having in its body a spiral groove with tapered or inclined side walls or faces, a head mounted on the shaft and endwise movable thereon, journals or stems rotatably mounted in the head on opposite sides thereof each journal or stem having a bearing face or contact with a cone-shaped or tapered peripheral face or wall of less diameter than the width of the spiral groove and of a less depth than the depth of the spiral groove for engaging the side face or wall of the spiral groove on the opposite sides of the bearing or contact with a clearance-space between the bottom of the groove and the end face of the bearing or contact and an adjustable journal-bearing for carrying each journal or stem entered into the head on opposite sides and transversely of the shaft, substantially as described.

4. In a mechanism for converting motion, the combination of a shaft having in its body a spiral groove with tapered or inclined side walls or faces, a head mounted on the shaft and endwise movable thereon, journals or stems rotatably mounted in the head on opposite sides thereof, each journal or stem having a bearing or contact with a cone-shaped or tapered peripheral face or wall to engage the side face or wall of the spiral groove, a fixed cone and an adjustable cone on each journal or stem, an adjustable sleeve for each journal or stem into which the journal or stem is entered, and balls between the face of the cones on the journal or stem and the face of the sleeve, substantially as described.

5. In a mechanism for converting motion, the combination of a shaft having in its body a spiral groove with tapered or inclined side walls or faces, a head mounted on the shaft and endwise movable thereon, journals or stems rotatably mounted in the head on opposite sides thereof each journal or stem having a bearing face or contact with a cone-shaped or tapered peripheral face or wall to engage the side face or wall of the spiral groove, an adjustable sleeve for each journal or stem, a flange on the interior wall of the sleeve, a fixed cone and an adjustable cone on the journal or stem, and balls between the fixed cone and the sleeve-flange and between the adjustable cone and the sleeve-flange, substantially as described.

6. In a mechanism for converting motion, the combination of a shaft having in its body, a spiral groove with tapered or inclined side walls or faces, a head mounted on the shaft and endwise movable thereon, journals or stems rotatably mounted in the head on opposite sides thereof each journal or stem having a bearing or contact face with a cone-shaped or tapered peripheral face or wall to engage the side face or wall of the spiral groove, an adjustable sleeve for each journal or stem entered into the head on opposite sides and transversely of the shaft, a cone on the journal or stem and balls between the cone and the face of the sleeve, substantially as described.

7. In a mechanism for converting motion, the combination of a shaft having in its body a spiral groove, a head mounted on the shaft and endwise movable thereon, journals or stems rotatably mounted in the head on opposite sides thereof each journal or stem having a bearing or contact face to engage with the spiral groove of the shaft, an adjustable sleeve for each journal or stem, cones on the journals or stems, and balls for the cones around the journals or stems, substantially as described.

8. In a mechanism for converting motion, the combination of a shaft having in its body a spiral groove with tapered or inclined side walls or faces, a head mounted on the shaft and endwise movable thereon, a journal or stem rotatably mounted in the head and having a bearing or contact with a cone-shaped or tapered peripheral face or wall to engage the side face or wall of the spiral groove, and an adjustable journal-bearing carrying the journal or stem and entered into the head transversely of the shaft, substantially as described.

9. In a mechanism for converting motion, the combination of a shaft having in its body a spiral groove, a head mounted on the shaft and endwise movable thereon, a journal or stem rotatably mounted in the head and having a bearing or contact with a peripheral end face or wall to engage the spiral groove, a fixed cone and an adjustable cone on the journal or stem, an adjustable sleeve for the journal or stem and into which the journal or stem is entered, and balls between the face of the cones on the journal or stem and the face of the sleeve, substantially as described.

JOHN M. RAUHOFF.

Witnesses:
   THOMAS B. McGREGOR,
   BELLE W. BARRY.